United States Patent [19]
Imanaka et al.

[11] Patent Number: 4,885,693
[45] Date of Patent: Dec. 5, 1989

[54] WHEEL-SLIP DETECTION SYSTEM

[75] Inventors: Asaji Imanaka; Tatsuo Fujiwara, both of Kobe; Shuichi Osaka, Osaka, all of Japan

[73] Assignee: Nippon Air Brake Co., Ltd., Kobe, Japan

[21] Appl. No.: 245,493

[22] Filed: Sep. 19, 1988

Related U.S. Application Data

[63] Continuation of Ser. No. 834,295, Feb. 27, 1986, abandoned.

[30] Foreign Application Priority Data

Feb. 27, 1985 [JP] Japan .................................. 60-39912

[51] Int. Cl.$^4$ .................................. B60T 8/58
[52] U.S. Cl. .................................. 364/426.02; 180/197; 361/238
[58] Field of Search .................... 364/426.02; 180/197; 361/238; 303/94–97, 105–107

[56] References Cited

U.S. PATENT DOCUMENTS

| | | | |
|---|---|---|---|
| 4,446,522 | 5/1984 | Sato et al. | 303/105 |
| 4,491,920 | 1/1985 | Wood et al. | 303/105 |
| 4,681,374 | 7/1987 | Nakamura et al. | 180/197 |

*Primary Examiner*—Gary Chin
*Attorney, Agent, or Firm*—J. B. Sotak

[57] ABSTRACT

A wheel slip detection system which is especially effective in cases where a gentle or sluggish slip simultaneously occurs on all the axles of a vehicle. For instance, when the velocity difference ($\Delta V$) between the standard speed, namely, the maximum axle speed, of two or more axles exceeds the preset velocity, this condition is detected as a slip state. In the present system, the first and second velocity values $V\alpha 1$ and $V\alpha 2$ are set, and it is detected as a slip of all axles when the following (a), (b), (c) states occur at each axle wherein:
(a) $V\alpha 1 < \Delta V$,
(b) Max. $\Delta V < V\alpha 2$,
(c) Max. axle acceleration < Standard acceleration.

19 Claims, 2 Drawing Sheets

WHEEL-SLIP DETECTION SYSTEM

This is a continuation of co-pending application Ser. No. 834,295 filed on Feb. 27, 1986 now abandoned.

FIELD OF THE INVENTION

This invention is used in a railroad car brake system and relates to a method for the detection of wheel slip by determining the speed of the axle on which the wheels are fixed, and which evaluates the slipping of the wheel based on this velocity signal.

BACKGROUND OF THE INVENTION

Referring now to Japanese Patent No. 57-55001, it will be seen that a prior art type of wheel-slip detection system is shown and disclosed therein. As shown in the patent, the velocity of each wheel axle is determined and the highest wheel velocity is designated as the standard velocity for comparison with the speed of each individual wheel axle to obtain the velocity difference between the wheel axles.

When the differential value of the velocity described above is obtained, the deceleration is determined by differentiating the velocity of each axle; and when each of these velocity differences or each differential value or each deceleration exceeds the set point, it is assumed that wheel slip is occurring. This slipping information is transmitted to the braking system and is used to control the force with which the brakes are applied. Each railroad car wheel also experiences the phenomenon of self-readhesion, which may occur without a reduction of the braking force, so that the slipping disappears naturally, even if the wheel-slip did start as a result of the application of the braking force. This phenomenon should also be taken advantage of as much as possible to shorten the distance required for braking. In the prior art system described above, the set point was relatively high, so as to broaden the area in which no response was made, with the result that slight degrees of slip could not be detected. However, when all the wheel axles experienced a slight degree of slip at the same time, the axle which is used to determine the standard velocity is also slipping. Thus, the velocity difference of each wheel axle from the standard velocity or the differential of these velocity differences, namely, the deceleration which differentiates the velocity of each axle, is relatively small. Therefore, a slight slip caused at the same time (called "sluggish slip" hereinafter) cannot be detected for a significant length of time by the existing system, since the set point is high. In the worst case, all the axles start to slip at once, and the braking distance increases. This can cause the outer thread of the wheel to be worn or flattened, which is a decided disadvantage.

OBJECTS OF THE INVENTION

Therefore, it is an object of the invention to provide a system for the detection of wheel slip which does not detect a slight localized slip and in which the self-readhesion phenomenon of the wheel is used to good advantage so that when most of the wheels are in the sluggish-slip state, it detects this condition so that the braking distance will be shortened and so that the flattening or wearing of the outer thread of the wheel can also be eliminated.

With regard to the present system of slip detection, the velocity of the (n) number of axle members, where n is an integer larger than 3, is determined; and the highest speed among them is used to determine the standard velocity, so that the velocity difference of each axle wheel, in relation to the standard velocity, or the differential value of those velocity differences, or the deceleration are obtained. These velocity differences or their differential value or the deceleration is obtained by differentiating each wheel axle velocity as it becomes higher than the set point, so that it can be assumed that slip is occurring.

In the present invention, there are two set points, with the second set point higher than the first set point. It is assumed that all the axles are slipping only when the number of the velocity difference or its differential value or deceleration exceeds the first set point, which is higher than the set number.

An object of the present invention is to provide a wheel-slip detection system which is especially effective in a case where a gentle or sluggish slip simultaneously occurs on all the axles of a vehicle. For instance, when the velocity difference ($\Delta V$) between the standard speed, namely, maximum axle speed, of two or more axles, exceeds the preset velocity, this condition is detected as a slip state. In this system, the first and second velocity values $V\alpha 1$ and $V\alpha 2$ are set, and it is detected as a slip of all the axles when the following (a), (b), (c) states occur at each axle wherein:

(a) $V\alpha 1 < \Delta V$ (b) Max. $\Delta V < V\alpha 2$, (c) Max. axle acceleration < Standard acceleration.

Thus, when the velocity difference or its differential value and/or deceleration are all below the second set point, then every acceleration obtained by differentiating each wheel axle velocity is less than the standard acceleration.

SUMMARY OF THE INVENTION

In accordance with the present wheel-slip detection system, when most of the wheels are in the sluggish sliding state, most of the velocity differences or differentials or decelerations will exceed the first set point, so that the number is higher than the set number; also when the velocity difference or the differential value and/or deceleration are all less than the second set point; and also when all of the above-mentioned acceleration values are less than the standard acceleration, namely, when the velocity difference between each wheel axle or the deceleration is small during the braking, when there is no accelerating or recovering wheel which can expect to experience the self-readhesion phenomenon, it can be assumed that there is sluggish slip of every axle, and that it can be detected.

BRIEF DESCRIPTION OF THE DRAWINGS

The above objects and other attendant features and advantages of the present invention will become more readily apparent from the following detailed description, when considered in conjunction with the accompanying drawings, wherein.

DETAILED DESCRIPTION OF THE INVENTION

In the following explanation of the preferred embodiment, it will be assumed that the number of axle members n is four (4) with reference to FIGS. 1 and 2.

Figure 1:
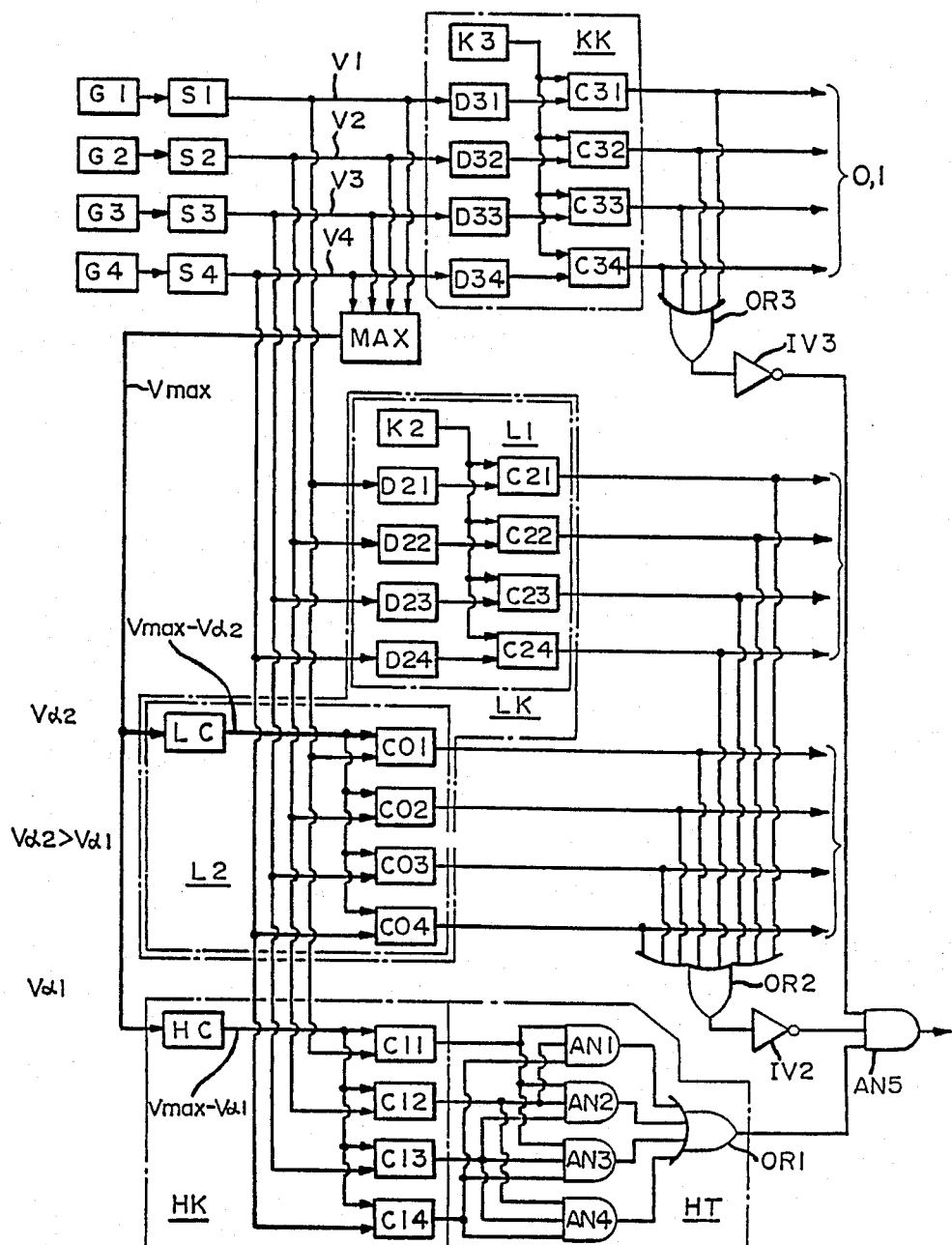
FIG. 1 is a block diagram of a preferred embodiment of the wheel-slip detection system, which incorporates the apparatus described in the subject invention.

Referring to the drawings, and in particular to FIG. 1, there is one example of a wheel-slip detection system which incorporates the operational method of the present invention.

As shown, four (4) velocity generators G1, G2, G3, and G4 are provided near each end of the axles to which the wheels are mounted. Each generator produces an AC voltage signal having a frequency which is proportional to the speed of rotation of the respective axle. The output signals of the generators G1–G4 are fed to a respective one of four (4) velocity-detecting circuits S1–S4 which produce voltages proportional to the respective velocity signals, namely, velocity signals V1–V4 which correspond to the peripheral speed of the respective wheel.

It will be observed that the velocity signals V1–V4 are transferred or fed to the recovery-detection circuit KK and also to the maximum-velocity generation circuit MAX, as well as to the low-sensitivity slip-detection circuit LK and to the high-sensitivity slip-detection circuit HK.

The recovery-detection circuit KK consists of four (4) acceleration detectors D31–D34, standard acceleration generator K3, and four (4) acceleration comparators C31–C34. The acceleration detectors D31–D34 produce the acceleration signals by differentiating the velocity signals V1–V4. The standard acceleration generator K3 generates the standard acceleration signal. The acceleration comparators C31–C34 compare the acceleration signal coming from the above-mentioned detectors D31–D34 with the standard acceleration signal coming from the above-mentioned generator K3. When each of the acceleration signals is less than the standard acceleration signal, the outputs of the above-mentioned comparators C31–C34 are 0. When each of the acceleration signals is higher than the standard acceleration signal, the outputs of the above-mentioned comparators C31–C34 are 1. In other words, the recovery-detection circuit KK can identify the self-readhesion of the wheel when the acceleration, with which the velocity of the wheel axle is differentiated, becomes greater than the standard acceleration. Thus, the output of this detecting circuit KK is transferred or fed to the AND gate AN5, via the OR gate OR3 and the inverter IV3, and, in turn, to the brake control apparatus (not shown) to convey the acceleration information for each wheel axle.

The maximum-velocity generation circuit MAX selects the signal, namely, the highest and fastest wheel among the velocity signals V1–V4 (which is derived from the above-mentioned detectors S1–S4) and provides an output signal as the standard velocity signal Vmax. This signal is transferred or fed to the second standard velocity generation circuit LC of the low-sensitivity slip-detection circuit LK, and to the first standard velocity generation circuit HC of the high-sensitivity slip-detection portion HK. The low-sensitivity slip-detection circuit LK includes a deceleration-detection circuit L1, as well as a velocity-difference detection circuit L2. The deceleration-detection circuit L1 includes four (4) deceleration-detectors D21–D24, standard deceleration generator K2, and four (4) deceleration comparators C21–C24. The deceleration detectors D21–D24 produce the deceleration signals by differentiating the velocity signals V1–V4. The standard deceleration generator K2 generates the standard deceleration signal. The deceleration comparators C21–C24 compare the deceleration signals produced by the above-mentioned detectors D21–D24 with the standard deceleration signal from the above-mentioned generator K2. When each of the deceleration signals is less than the standard deceleration signal, the outputs 1 of the above-mentioned comparators C21–C24 are 0. When each of the deceleration signals is greater than the standard deceleration signal, the outputs of the above-mentioned comparators C21–C24 are 1. In other words, this low-sensitivity deceleration-detection circuit L1 detects the fact that significant slip is occurring on the wheels when the deceleration, which is what takes place when the velocity of the wheel axle is differentiated, exceeds the relatively high standard deceleration. The output of the detection circuit L1 is transferred or fed to the AND gate AN5 via the OR gate OR2 and the inverter IV2, and to the pressure control equipment, such as, the brake control system for discerning the deceleration data for the wheel axle. The velocity-difference detection circuit L2 includes a second standard velocity generator LC, and four (4) second velocity-difference comparators CO1–CO4. A standard velocity signal Vmax is generated by the maximum-velocity generation circuit MAX. The standard velocity signal Vmax is combined with a second set point V$\alpha$2 in the second standard generator LC to produce an output signal, namely, the second standard velocity signal, which is, for example, the resultant (Vmax − V$\alpha$2). The second set point V$\alpha$2 corresponds to (10 + 0.05 × Vmax) Km/h, which is determined from the above-mentioned standard velocity signal Vmax. The second standard velocity signal (Vmax − V$\alpha$2) is fed to the second velocity-difference comparators CO1–CO4. The second velocity difference comparators CO1–CO4 compare the above-mentioned second standard velocity signal (Vmax − V$\alpha$2) with velocity signals V1–V4. The above-mentioned comparators CO1–CO4 produce a logical 1 when each of the velocity signals (V1–V4) is less than the second standard velocity signal (Vmax − V$\alpha$2), and the comparators (CO1–CO4) produce a logical 0 when each of the velocity signals V1–V4 is greater than the second standard velocity signal (Vmax − V$\alpha$2). In other words, this low-sensitivity velocity difference-detection circuit L2 compares each of the velocity signals V1–V4 with the standard velocity signal Vmax, so that when the velocity difference becomes greater than the relatively high second set point V$\alpha$2, it assumes there is significant slip occurring on the wheels. Thus, the output of the detecting circuit L2 is transferred or fed to one input of the three-input AND gate AN5 via the OR gate OR2 and the inverter IV2, and at the same time is transferred or fed to other related apparatus as the low-sensitivity slip value of the wheels. Therefore, the low-sensitivity slip-detection circuit LK, which includes the above-mentioned deceleration-detection circuit L1, and the velocity-difference detection-circuit L2 assume the wheels are slipping if one of the above-mentioned comparators C21–C24 and CO1–CO4 produce an output 1. Further, it is assumed that no significant slip is occurring if all the outputs are 0.

The high-sensitivity slip-detection circuit HK includes the first standard velocity generator HC, which is connected to the standard velocity signal Vmax from the maximum velocity generation circuit MAX, and which provides an output of (Vmax−Vα1). The result is the subtraction of the first set point Vα1 which is lower than the second set point Vα2, which may be, for example, 5 km/h, from the above-mentioned standard velocity signal Vmax. The first standard velocity signal and the first velocity-difference comparators C11–C14 compare each velocity signal V1–V4 with the first standard velocity signal (Vmax−Vα1); which results in outputs 1 when each velocity signal V1–V4 is less than the first standard velocity signal (Vmax−Vα1); and which results in outputs 0 when each velocity signal V1–V4 is higher than the first standard velocity signal Vmax−Vα1). In other words, this high-sensitivity slip-detection portion HK compares each of the velocity signals V1–V4 with the standard velocity signal Vmax, and when its velocity-difference exceeds the relatively low first set point Vα1, it assumes that the wheels are slipping. Conversely, when the velocity difference is less than the first set point Vα1, it assumes that the wheels are not slipping at all. As shown, the output of the detection circuit HK is transferred or fed to the high-sensitivity axle slip evaluation circuit HT. This high-sensitivity axle slip evaluation circuit HT sets the number which is used as the evaluation standard, at three (3). The circuit HT consists of four (4) two-input AND gates AN1–AN4 and a four-input OR gate OR1. When three (3) of the first velocity-difference comparators C11–C14 of the high-sensitivity slip-detection circuit HK has an output 1 and the OR gate has an output 1, the detection circuit assumes that most of the wheel axles are slipping. When a number of the first velocity comparators have an output 1, which is less than 2, it is assumed that most of the wheel axles are not slipping.

The output of the evaluation circuit HT is transferred or fed to one input of the three-input AND gate AN5. Therefore, the acceleration information from the recovery-detection circuit KK is transferred or fed to the AND gate AN5 via the four-input OR gate OR3 and the inverter IV3. The deceleration information and the slip information from the low-sensitivity slip-detection portion LK is transferred or fed, via the eight-input OR gate OR2 and the inverter IV2, to the AND gate AN5. The slip information from the high-sensitivity slip-detection circuit HK is transferred or fed, via the above-mentioned evaluation circuit HT, to the AND gate AN5. Therefore, the output 1 of this AND gate AN5 is assumed to mean that the whole axle is slipping in the sluggish-slip manner. In other words, when the output of AN5 becomes 1, it is assumed that most of the wheel axles are sluggishly slipping only when all the outputs of the comparators C31–C34, C21–C24, CO1–CO4 are at binary 0 and also three (3) of the comparators C11–C14 have an output of 1. The output of this AND gate AN5 is also transferred to other portions of the braking system.

Figure 2:
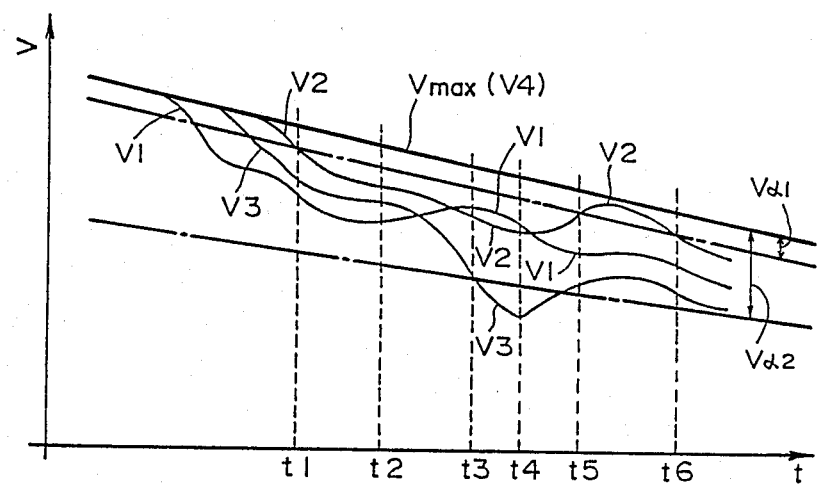
FIG. 2 is a graphic illustration of the changing status curves of velocity V during the braking mode, in relation to the time t which is a representation of the operation of the system shown in FIG. 1.

The following is an explanation of the change of velocity V of each wheel axle in relation to time t during braking of the vehicle with reference to FIG. 2, which is illustrative of one type of operation. In FIG. 2, value V4 is the maximum velocity Vmax which is the maximum wheel axle velocity. The values V1–V3 are the velocities of the other three (3) wheel axles. The value Vα1 is the first set point, and the value Vα2 is the second set point. Until the time t1, the number of the first velocity-difference comparators which output 1 in the high-sensitivity slip-detection circuit HK, is less than two (2); and the set number of the high-sensitivity slipping axle number evaluation circuit HT, is 3. Therefore, the output of the four-input OR gate OR1 is at 0, so that the output of the AND gate AN5 is at 0. Thus, the outputs of the recovery-detection circuit KK and the low-sensitivity slip-detection circuit LK (the information of the whole axle slip, sluggish slip) will not be sent. At this time, if the actual deceleration exceeds the standard deceleration, the output of the deceleration-detection circuit L1 is at a binary 1, which is representative of the deceleration information. After the time t1, all the velocity-difference comparators will exceed the first set point Vα1 value, and three (3) of the first velocity-difference comparators C11–C13 of the high-sensitivity slip-detection circuit HK have an output 1, and the OR gate OR1 of the above-mentioned evaluation circuit HT will have an output 1. At this time, since there is no accelerating wheel axle, all the outputs of the acceleration comparators C31–C34 of the recovery-detection circuit KK are at a binary 0 and the OR gate OR3 is also at a binary 0, and the inverter IV3 is at a binary 1.

During the time between t1–t2, the deceleration is negligible, and therefore all the outputs of the deceleration comparators C21–C24 are at a binary 0. In addition, the velocity difference is less than the second set point Vα2 and all the outputs of the second velocity-difference comparators CO1–CO4 are at a binary 0, so that output of the OR gate OR2 is at a binary 0 while the output of the inverter IV2 is at a binary 1. Therefore, between time t1 and time t2, the AND gate AN5 is at a binary 1 and the whole axle slip, sluggish slip indication will be sent. When time t2 is reached, all the velocity differences have exceeded the first set point Vα1; however, the wheel axle with velocity V1 is accelerating, and the acceleration comparator C31 of the recovery-detection circuit KK is at a binary 1, and the inverter IV3 is at a binary 0, so that the AND gate AN5 is at a binary 0 and the wheel axle slip information disappears. However, in the range between times t2–t3, the deceleration of the wheel axle with the velocity V3 is relatively high, and the output of the deceleration comparator C23 of the deceleration detection L1 is at a binary 1, and the slip indication is only sent for this axle.

In the range between times t3–t4, all the velocity differences will exceed the first set point Vα1, and the OR gate OR1 of the above-mentioned evaluation circuit HT is at a binary 1, and the inverter IV3 is at a binary 1. Since there is no accelerating wheel axle, however, the velocity difference between the velocity V3 and the standard velocity Vmax exceeds the second set point Vα2, and the second velocity comparator CO3 is at a binary 1, and the inverter IV2 is at a binary 0. Therefore, the output of the AND gate AN5 is still a binary 0, and the information that all the axles are slipping, will not appear.

However, at this time, the slip indication of the axle with the velocity V3, is sent. After time t4, the wheel axles with the velocities V2 and V3 begin to accelerate, and the output of the acceleration comparators C32, C33 of the recovery-detection circuit KK becomes a binary 1, to which is sent acceleration information, so that the output of the inverter IV3 becomes a binary 0 and the output of the AND gate AN5 is still a binary 0 and the information that all shafts are slipping, will not appear.

But, in the first portion between times t4–t5, the slip-indication of the axle of the velocity V3 is sent; and, depending on the amount of the deceleration of the velocity V1, the slip indication of that wheel axle will also be sent.

In the range between times t5–t6, the velocity difference between the velocity V2 and the standard velocity Vmax is less than the first set point $V\alpha 1$, so that the OR gate OR1 will be at a binary 0 and the AND gate AN5 will be at a binary 0 and the information that all axles are slipping, will not appear. However, in the first portion of range t5–t6, the acceleration of the wheel axles V2 and V3 exceeds the standard acceleration, so that the acceleration comparators C32, C33 will be at a binary 1, to give the acceleration indication. After time t6, each velocity-difference exceeds the first set point $V\alpha 1$, and the number of comparators is three (3), which is the setting number, so that the OR gate OR1 is at a binary 1. Also, at this time, there is no axle which is accelerating, and every output of the acceleration comparators C31–C34 is a binary 0, so that the inverter IV3 is a binary 1. Since each velocity difference is less than the second set point $V\alpha 2$, every output of the second velocity-difference comparators CO1–CO4 is a binary 1; and at the same time, since each deceleration is slight, every output of the deceleration comparators C21–C24 is a binary 0, while the output of the inverter IV2 is a binary 1. Therefore, in this case, the output of the AND gate AN5 becomes a binary 1, and the indication that all the axles are slipping in a sluggish-slip manner, is indicated.

In the embodiment described above, the number of axle members n is four (4); and the setting number, which is the one standard factor for the evaluation of sluggish slip, is three (3). However, the number of axle members can be three (3) and the setting number can be two (2). In the embodiment described above, the low-sensitivity slip-detection circuit LK consists of the deceleration-detection circuit L1 and the velocity-difference detection circuit L2; however, it can also consist of just one of them, or the one in which the velocity differential is evaluated, or a combination of the above.

Furthermore, in the embodiment described above, the high-sensitivity slip-detection circuit HK is the one which evaluates the velocity difference; however, it can also be the one which evaluates the velocity differential, or which simply evaluates the deceleration, or a combination of the above.

As is clear from the above description, the following effects can be achieved by this invention:

1. When most of the wheel axles begin a slight or gentle slip at the same time, the velocity difference or differential or the deceleration does not exceed the high second set point, delimiting the nonsensitive area, so that it cannot detect the slip; and self-readhesion cannot be expected if there is no accelerating, namely, recovering wheel axle, and all the wheel axles might slip. In such a case, the first set point, which is lower than the above-mentioned second set point, is also used, so that when the velocity difference or the differential value exceeds the first set point, it assumes the wheel axle is slipping and its information is sent. Thus, this information can be used to reduce the braking force on all the wheel axles. Therefore, the self-readhesion of the wheel is encouraged and the braking distance can be shortened. Thus, this can be used to prevent the formation of a flat spot on the outer threads of the wheels.

2. When one or more wheel axles cause a great deal of slip, in that the velocity-difference or differential value or the deceleration exceeds the second set point, self-readhesion cannot be expected to occur. Thus, it is not assumed that all the wheels are slipping, but it can be assumed that only the wheel axle in question is slipping. Therefore, using this data, only the braking force to this wheel need to be reduced.

3. Where the following nomenclature is used:
G1–G4: velocity generators
S1–S4: velocity-detection circuits
V1–V4: velocity
MAX: maximum-velocity generation portion
Vmax: standard velocity
KK: recovery-detection portion
LK: low-sensitivity slip-detection portion
HK: high-sensitivity slip-detection portion
L1: deceleration-detection portion
L2: velocity-difference detection portion
K2: standard deceleration generation portion
K3: standard acceleration generation portion
$V\alpha 1$: first set point
$V\alpha 2$: second set point.

We claim:

1. A wheel-slip detection system comprising, a first means for establishing a first velocity set point; a second means for establishing a second velocity set point which is higher than the first velocity set point; a third means for determining that at least one wheel axle is slipping when the velocity difference of any two or more wheel axles exceeds the first velocity set point, and also when the velocity difference of two or more axles is less than the second velocity set point, and also when an acceleration obtained by differentiating the velocity of each wheel axle is less than a standard acceleration; and slip-detection means for detecting the velocities of the n wheel axles where n is an integer of more than three (3) and for determining the velocity difference of each wheel axle by comparing the velocity of each wheel axle to a standard velocity, said slip-detection means detects which is the highest velocity among the n wheel axles to produce the standard velocity and which determines the wheel axles are slipping when the difference of the velocity of each wheel axle exceeds the second velocity set point.

2. The wheel-slip detection system as defined in claim 1, wherein said slip-detection means includes a low-sensitivity slip-detection circuit for comparing the velocity of each of the wheel axles with a second standard velocity and for comparing deceleration of each of the wheel axles with a standard deceleration to determine whether the wheel axles are slipping.

3. The wheel-slip detection system as defined in claim 1, wherein a maximum-velocity generation circuit produces the standard velocity.

4. The wheel-slip detection system as defined in claim 1, wherein said slip-detection means includes a high-sensitivity slip-detection circuit for comparing the velocity of each of the wheel axles with a first standard velocity to determine whether the wheel axles are slipping.

5. The wheel-slip detection system as defined in claim 4, wherein said high-sensitivity slip-detection circuit includes a plurality of velocity difference comparators.

6. The wheel-slip detection system as defined in claim 5, wherein said high-sensitivity slip-detection circuit includes a plurality of AND gate circuits connected to said plurality of velocity difference comparators.

7. The wheel-slip detection system as defined in claim 6, wherein said high-sensitivity slip-detection circuit includes an OR gate circuit connected to said plurality of AND gate circuits.

8. The wheel-slip detection system as defined in claim 7, wherein said OR gate circuit is connected to a three-input AND gate circuit.

9. The wheel-slip detection system as defined in claim 2, wherein said low-sensitivity slip-detection circuit includes a plurality of velocity difference comparators.

10. The wheel-slip detection system as defined in claim 9, wherein said low-sensitivity slip-detection circuit includes a plurality of deceleration detectors.

11. The wheel-slip detection system as defined in claim 10, wherein said low-sensitivity slip-detection circuit includes a plurality of deceleration comparators connected to said plurality of deceleration detectors.

12. The wheel-slip detection system as defined in claim 11, wherein said velocity difference comparators and said deceleration detectors are connected to an eight-input OR gate circuit.

13. The wheel-slip detection system as defined in claim 12, wherein said eight-input OR gate circuit is connected to a three-input AND gate circuit.

14. The wheel-slip detection system as defined in claim 1, wherein said-detection means includes a recovery detection circuit for determining self-readesion of a wheel when its acceleration becomes greater than a standard acceleration.

15. The wheel-slip detection system as defined in claim 14, wherein said recovery detection circuit includes a plurality of acceleration detectors.

16. The wheel-slip detection system as defined in claim 15, wherein said recovery detection circuit includes a plurality of acceleration comparators connected to said plurality of acceleration detectors.

17. The wheel-slip detection system as defined in claim 16, wherein said plurality of acceleration comparators are connected to a four-input OR gate circuit.

18. The wheel-slip detection system as defined in claim 17, wherein said four-input OR gate circuit is connected to a three-input AND gate circuit.

19. The wheel-slip detection system as defined in claim 18, wherein said three-input AND gate circuit outputs a binary "1" when a sluggish slip is detected for causing a reduction of braking force on the wheel axles.

* * * * *

UNITED STATES PATENT AND TRADEMARK OFFICE
CERTIFICATE OF CORRECTION

PATENT NO. : 4,885,693
DATED : December 5, 1989
INVENTOR(S) : Asaji Imanaka, Tatsuo Fujiwara, Shuichi Osaka It is certified that error appears in the above-identified patent and that said Letters Patent is hereby corrected as shown below:

Column 10, line 2, delete "-detection" and insert -- slip-detection --

Signed and Sealed this

Sixth Day of November, 1990

Attest:

HARRY F. MANBECK, JR.

*Attesting Officer*  *Commissioner of Patents and Trademarks*